May 21, 1929.   G. D. LUCE   1,714,272
CANE HARVESTER
Filed Nov. 29, 1919   3 Sheets-Sheet 3
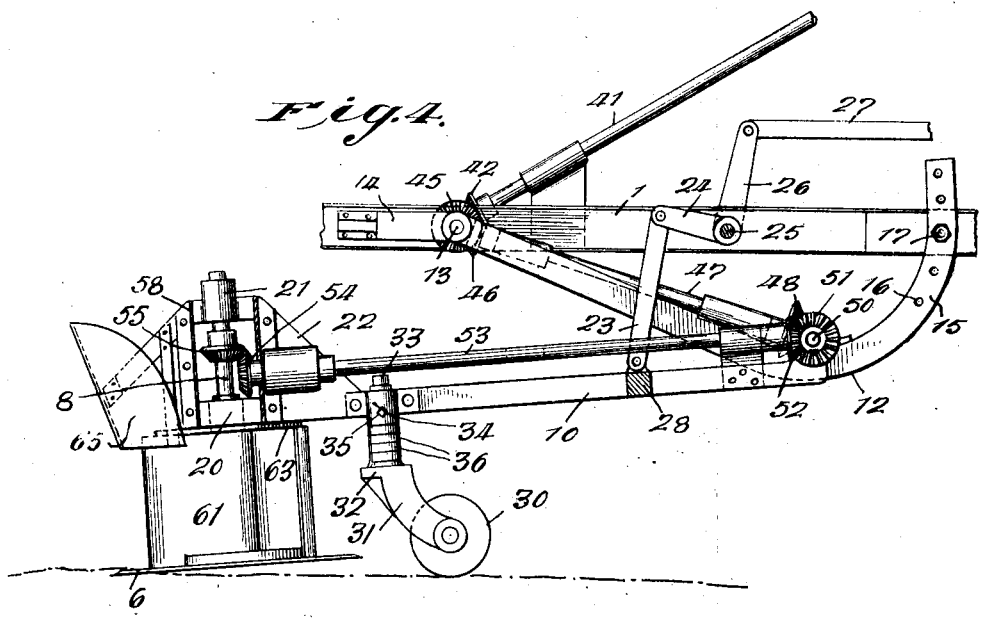
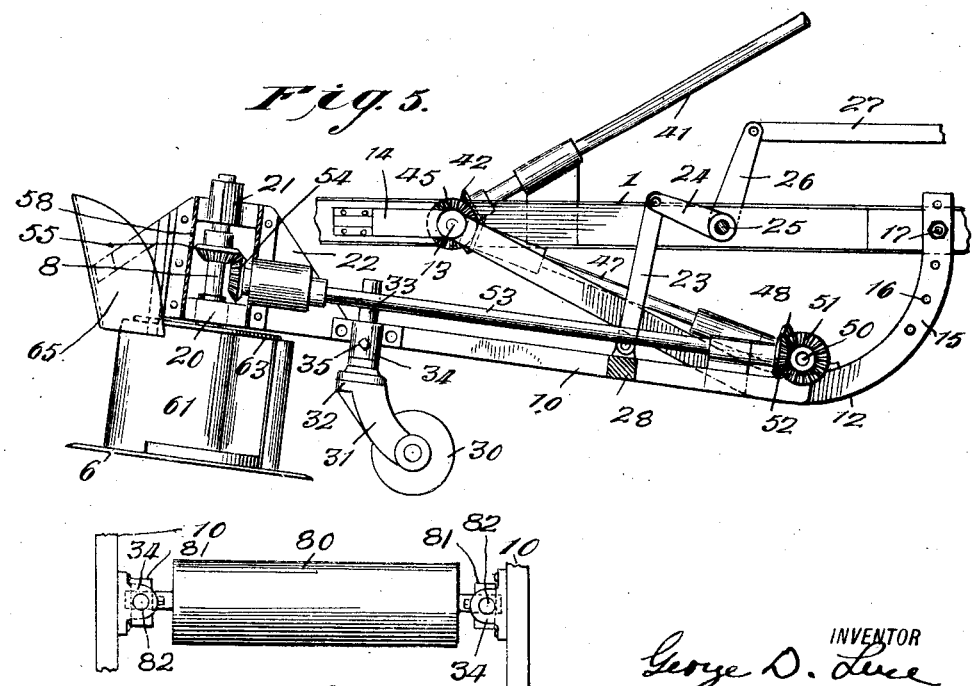
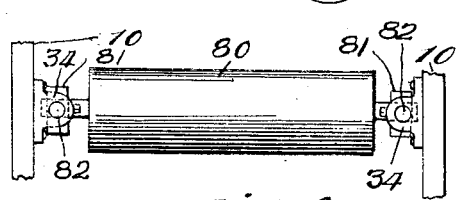
INVENTOR
George D. Luce
BY
ATTORNEYS Patented May 21, 1929.

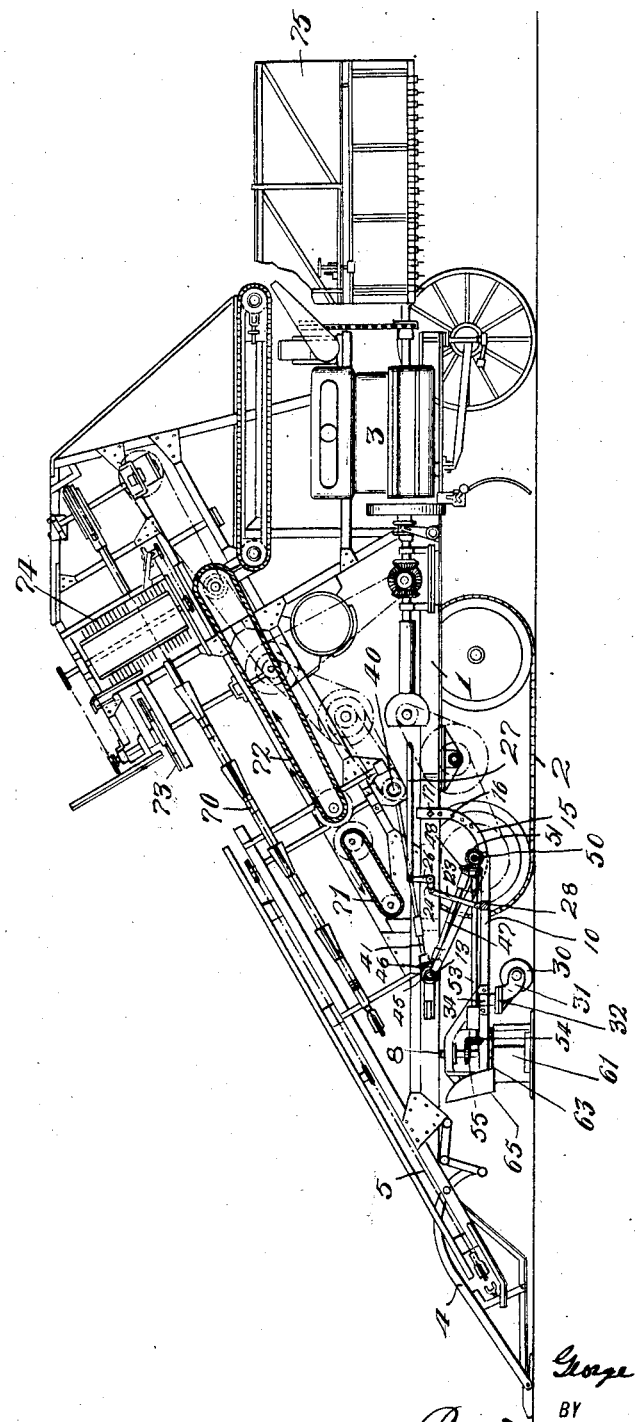

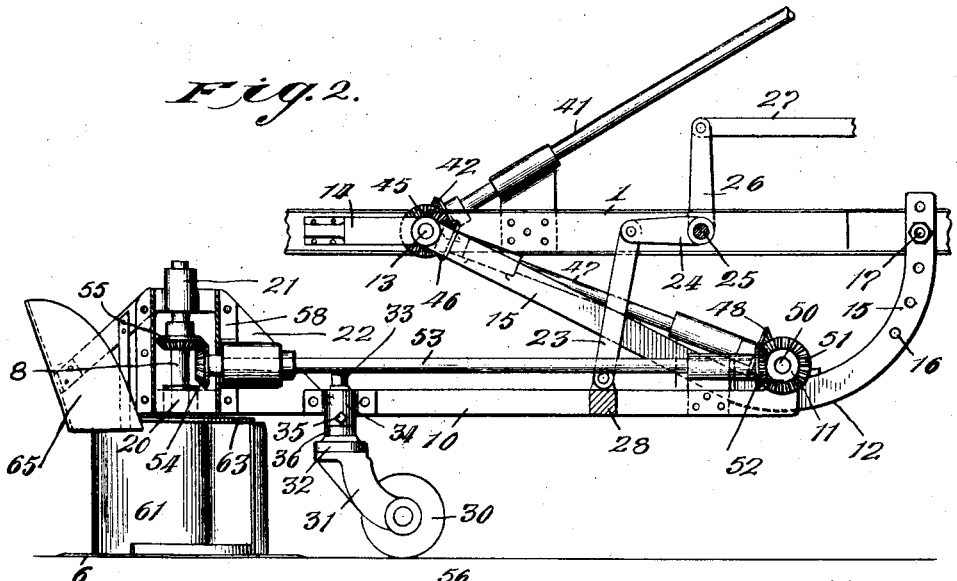

1,714,272

UNITED STATES PATENT OFFICE.

GEORGE D. LUCE, OF WATERTOWN, WISCONSIN, ASSIGNOR TO LUCE CANE HARVESTER CORPORATION, OF NEW YORK, N. Y., A CORPORATION OF DELAWARE.

CANE HARVESTER.

Application filed November 29, 1919. Serial No. 341,425.

This invention relates to improvements in apparatus for harvesting sugar cane or similar crops, and particularly to the means for cutting the cane at the ground and the parts associated therewith.

In my Patent No. 762,073, granted June 7, 1904, entitled Harvester I disclosed bottom cutting means for sugar cane comprising a pair of horizontal, overlapping discs, positively rotated, and the present invention is especially applicable to cutters of this general type. Among the objects of the invention are to provide improved means for adjustably mounting the cutters so as to provide for varying the elevation thereof and also preferably to permit adjustment of the inclination of the cutters to the ground; to provide improved supporting means for the cutters for maintaining their elevation during use; and to provide improved means for preventing the cutters and their shafts from becoming choked or entangled with trash so as to interfere with the proper operation of the machine.

For the purpose of illustrating the present invention I have shown the same in connection with a complete cane harvester of the general type disclosed in my Patent No. 1,053,917, granted Feb. 18, 1913, entitled Cane strippers, the harvester shown embodying also the improved specific construction disclosed in my Patent No. 1,648,313, granted November 8, 1927, for sugar cane harvester. It is to be understood, however, that the present invention is not limited to use in such a machine.

In the accompanying drawings which form a part of this invention, and in which I have shown one specific embodiment of my invention as illustrative of the principle thereof and the best mode now known to me for performing the same:—

Figure 1 is a view partly in side elevation and partly in longitudinal section and somewhat diagrammatic in character, showing a harvester of the type referred to having the improved bottom cutting construction applied thereto;

Figure 2 is a view in central longitudinal section showing one of the cutters and parts associated therewith including the adjustable supporting devices, the section being taken on line II—II of Figure 3;

Figure 3 is a plan view of the cutters and their supporting devices and driving connections;

Figures 4 and 5 are views similar to view 2 showing different positions to which the parts may be adjusted.

Figure 6 is a fragmentary plan view showing a single transverse roller which may be substituted for the casters shown in the previous figures.

Referring to the drawings in detail, the harvester shown comprises a frame 1 mounted on the travelling tread elements 2 which support the harvester and also propel the same, the power for driving the travelling treads and the operative parts of the harvester being derived from the motor 3. Mounted at the extreme front of the machine is a separator plow 4 which is adapted to pass between the row of cane to be operated upon and the adjacent row of cane, so as to disentangle the cane of the two rows and lift the fallen cane. The cane of the row to be cut passes between traveling pick-up chains, one of which is shown at 5 in Figure 1, these chains acting to further straighten up the cane and hold it upright as it is cut, as more particularly shown and described in my aforesaid Patent No. 1,648,313.

As the machine advances along the row the cane is cut close to or preferably slightly below the ground surface by the rotary disc cutters 6 and 7. These cutters are fixed to the lower ends of shafts 8 and 9 respectively which are positively driven from the motor 3 by suitable gearing and are carried by the vertically adjustable arms 10. In the construction shown these arms 10 are pivoted at their rear ends on tubular bearings 11 which are mounted on cradle bars 12. The latter are pivotally supported at their forward ends on the main frame 1 of the harvester and are adjustably attached to such main frame at their rear ends. In the particular construction illustrated the cradle bars 12 are pivotally supported upon the inwardly projecting ends of short shafts 13 supported by the main frame members of the harvester and by the auxiliary brackets 14 attached thereto. At their rear end the cradle bars are curved upwardly as shown at 15 and are provided with a series of perforations 16, a bolt 17 being passed through one of these perforations and a corresponding hole in the main frame member of the harvester so as to hold the cradle bar in the desired adjusted position. By passing the bolt through one or another of the holes 16 it will be seen that the cradle bar and pivot bearing for the rear end of the corresponding bar 10 may be supported in any desired position of vertical adjustment. The shafts 8 and 9 are carried by the frame members 10 in any suitable manner, for instance, they may be journaled in suitable bearings 20 and 21, the former being fixed directly to the frame bars while the latter are carried some distance above the same by the brackets 22. For moving the bars up and down about their pivot bearings 11 any suitable devices may be employed, such for instance, as the links 23 connecting the bars with the lever arms 24 fixed to the transverse shaft 25, the latter carrying at one end a lever 26 connected by a link 27 with any suitable operating device (not shown), by which the shaft 25 may be rocked and the arms 10 raised or lowered. Preferably the arms 10 are directly connected so as to move together, a cross bar 28 being shown for this purpose in the construction illustrated. The link and lever mechanism described provides means for readily raising the arms 10 and the cutters to a position well above the ground surface, as indicated in Figure 5, when the machine is not operating. This mechanism may also be utilized to control the elevation of the cutters during the actual cutting operation, but in order to relieve the strain from such mechanism and to render it unnecessary for the operator of the machine to be continually manipulating the mechanism so as to maintain the cutters in the proper position for operating upon the cane at the desired point, I preferably provide supporting means adapted to travel along the ground surface adjacent to the cutters, such means tending to maintain the cutters always in the correct relationship to the ground. As illustrated, the broad caster wheels 30 are provided for this purpose, these wheels being journaled in brackets 31 which have swivel connection with bases 32. The latter are provided with upwardly extending studs 33 which are held in sleeves 34 mounted on the bars 10. The casters are preferably mounted in such a way as to be capable of vertical adjustment with respect to the bars 10, this being accomplished in the construction illustrated, by making the studs 33 capable of axial movement in the sleeves 34 and locking them in adjusted position in the sleeves in any suitable manner, as by set screws 35. One or more washers 36 may be interposed between the stud base and the lower end of the sleeve so as to give a firm bearing, washers being added or removed to secure the desired adjustment. The caster wheels 30 traveling along the ground surface close to the cutters support the bars 10 and cutters firmly in definite relationship to the ground and do not permit the cutters to work down too deep. They also follow undulations in the ground surface so as to automatically maintain the cutters in the correct position. The use of a swivel caster construction enables the wheels or rollers to travel properly if the course of the machine is changed, and also enables the wheels to pass small obstructions more freely, such for instance, as the cut stools of cane. The casters can swivel slightly so as to pass to one side or the other of obstructions of this nature.

In some instances it may be preferable to use a single transverse roller in place of the caster wheels. Such a construction is shown in Figure 6 in which 80 is the roller carried in brackets 81 having studs 82 adapted to fit in the sleeves 34. This permits the casters and roller to be quickly interchanged.

For driving the cutter shafts from the power apparatus of the harvester any suitable driving connections may be utilized, for instance, a series of shafts and bevel gears, as illustrated. In this construction a counter shaft extending across the harvester is located at the point 40, as shown in Figure 1, and is driven by suitable gearing from the motor 3. Driven from this counter shaft are the two shafts 41. These shafts carry bevel gears 42 at their forward ends which mesh with bevel gears 43 fixed to sleeves 44 which are journaled on the short shafts 13, already noted as forming the pivots for the cradle bars 12. The sleeves 44 also carry bevel gears 45 which mesh with bevel gears 46 on the shaft 47 which carry at their opposite end bevel gears 48 meshing with bevel gears 49 which are fixed to short shafts 50 journaled in the tubular bearings 11, upon which swivel the arms 10. The shafts 50 also carry bevel gears 51 which mesh with bevel gears 52 on shafts 53 which at their forward ends carry bevel gears 54 which mesh with gears 55 fixed to the cutter shafts, perferably between the bearings 20 and 21. It will be noted that the sleeves 44 carrying the gears 43 and 45 and the shaft 50 carrying the gears 49 and 51 are concentric respectively with the pivotal axes of the cradle bars 12 and cutter carrying bars 10 so that adjustment of these bars about their pivots may be freely made without interfering in any way with the drive. Where bevel gear drives are used they are preferably enclosed in suitable gear casings, such casings being illustrated in section at 56 and 57 in Figure 3, but being omitted from the other illustrations for sake of clearness. The gears 54 and 55 are preferably protected by suitable means, such as the shields or casings 58 which are fixed to the arms 10 and brackets 22 and which prevent the trash from getting entangled in these gears or from wrapping around the upper part of the cutter shafts 8 and 9 above the arms 10. In order to protect the portions of the cutter shafts below the arms 10 I preferably employ trash impellers rotating with such shafts, which fill the space between the cutters and the carrying arms. In the construction illustrated these impellers comprise the hubs 60 fixed to the shafts and cutters and carrying the projecting blades or wings or fins 61 which extend substantially the full vertical distance between the cutting discs and the arms 10. These wings are preferably rearwardly curved at their outer ends, as indicated at 62. At the top of the wings circular flanges 63 are preferably provided which revolve closely beneath the supporting arms 10 so as to prevent the trash from coming in contact with any exposed portion of the shafts below the supporting arms. As the cutters and trash impellers rotate the blades or wings 61 strike the trash lying on the ground ahead of the machine, pushing part of it laterally away from the cutters and acting to feed or impel the remainder of the trash, which is directly in the path of the inactive part of the cutters, rearwardly between the cutter shafts towards the rear and prevent it from accumulating in front of the cutters or in the throat of the machine between the cutters in such a way as to clog the machine or interfere with the free passage of the cane into and through the same. Cooperating with the rotary trash impellers described, fixed trash deflectors are preferably employed, one suitable construction of such deflectors being illustrated in the drawings, which show the convex sheet metal shields 65 arranged to prevent the trash from becoming entangled above the impeller blades.

The means which provide for the double vertical adjustability of the cutter carrying members 10, that is to say, in the specific construction illustrated, the means whereby the arms 10 may be pivoted around their supports on the bearing sleeves 11 and the further means whereby such pivot supports may be raised or lowered by the adjustment of the cradle bars 12 makes possible a wide range of vertical adjustment of the cutters and also permits the cutters to be operated in the desired angular relationship to the ground surface at any elevation. Thus, by properly adjusting the cradle bars as well as the bars 10 the cutters may be operated in a position parallel with the ground surface, the axes of the cutter shafts being perpendicular to the ground, in any position within the range of adjustability of the cradle bars 12. The apparatus is also capable of adjustment so as to give the cutter shafts a slight forward inclination, this usually being found preferable to arranging the shafts exactly vertical, as it gives the cutting discs a slightly upward inclination towards the rear and thereby provides a clearance under the rear part of the cutting discs which reduces the friction between the cutters and the ground and lessens the power required to rotate the cutters. This arrangement of the cutters is illustrated on a somewhat exaggerated scale in Figure 4. The mere pivoting of the arms 10 at the rear end to a fixed support would permit of a limited vertical adjustment of the cutters without varying the inclination thereof too greatly, but for securing the wider range of adjustment the use of the cradle bars or equivalent adjustable means for supporting the pivots of the arms 10 is highly desirable. It permits the vertical adjustment of the cutters to be accomplished without modifying the angular position to an objectionable degree.

In a harvester such as illustrated in Figure 1, after the cane has been severed by the bottom cutters and while still held upright by the pick-up chains 5, it is seized between traveling conveyor chains, one of which is indicated at 70 in Figure 1, and is conveyed upwardly and rearwardly by these chains through the harvester. The butts of the rearwardly traveling cane are engaged by the mud chain 71 which trips the cane into an upwardly and rearwardly inclined position, the butts being supported in this position first by the mud chain and then by the elevator chains 72. The cane while thus supported and carried through the machine is acted upon by the topping knife 73, which cuts off the green tops of the cane, and then by the stripping brushes 74, and is finally discharged into the hopper 75 from which it is deposited upon the ground or otherwise suitably disposed of. This part of the apparatus is the same as that described and claimed in detail in my Patent No. 1,648,313 above referred to.

While I have shown and described in detail one preferred embodiment of my invention as illustrative of the principle thereof, it is to be understood that changes may be made therein and I do not desire, therefore, to limit myself only to such specific embodiment, but intend to cover my invention broadly in whatever form its principle may be employed.

Having thus described my invention, I claim:—

1. In apparatus of the character described upright rotary shafts, bottom cutting means actuated thereby, carrying means for said shafts and bottom cutting means extending away from said shafts in substantially the line of travel of the machine, a frame to which said carrying means are pivoted at a substantial distance from said shafts, and a ground-engaging support for said carrying means attached thereto at a point in the rear of said cutting means and removed from the pivotal point of said carrying means.

2. In apparatus of the character described an upright rotary shaft, bottom cutting means at the lower end thereof, a vertically adjustable carrying member for said shaft, means for adjusting said carrying member and a unit trash impelling means rotatable with said shaft, and extending between the bottom cutting means and said adjustable shaft carrying member.

3. In apparatus of the character described an upright rotary shaft, bottom cutting means at the lower end thereof, a vertically adjustable carrying member for said shaft, means for adjusting said carrier member, trash impelling means rotatable with said shaft and extending between the bottom cutting means and said adjustable shaft carrying member, and a fixed trash guard for the upper part of said shaft carried by said carrying member.

4. In apparatus of the character described a vertically adjustable carrying member, an upright shaft carried thereby in relatively fixed vertical relationship therewith, means for adjusting said carrying member, bottom cutting means actuated by said shaft and also occupying a relatively fixed position with respect to said carrying member so as to be capable of vertical adjustment with the carrying member, and non-telescopic trash impelling means rotatable with said shaft and substantially filling the space between said bottom cutting means and said carrying member.

5. In apparatus of the character described a vertically adjustable carrying member, an upright shaft carried thereby in relatively fixed vertical relationship therewith, means for adjusting said carrying means, bottom cutting means actuated by said shaft and also occupying a relatively fixed position with respect to said carrying member so as to be capable of vertical adjustment with the carrying member, and non-telescopic trash impelling means rotatable with said shaft and substantially filling the space between said bottom cutting means and carrying member, said trash impelling means comprising outwardly projecting blades or fins fixed to said shaft.

6. In apparatus of the character described vertically adjustable carrying means, positively driven upright shafts carried thereby and depending below the same, means for adjusting said carrying means, bottom cutting discs carried by the lower ends of said shafts, and trash impelling blades projecting outwardly from said shafts and rotatable with said shafts and cutting discs, said blades extending substantially from said discs to the underside of said carrying means.

7. In apparatus of the character described vertically adjustable carrying means, means for adjusting said carrying means, a pair of upright parallel laterally spaced shafts carried by said carrying means and depending below the same, overlapping disc cutters mounted on the lower ends of said shafts, and trash impelling blades projecting from said shafts and rotatable with said shafts and cutting discs, said blades extending in a vertical direction from said bottom cutters to the underside of said carrying means and having maximum radii in a plane transverse to said shafts, such that the sum of the maximum radii of the impellers on the respective shafts is less than the distance between the shafts, whereby an open passageway is left between the impellers on the respective shafts at all times.

8. In apparatus of the character described, a main frame, vertically adjustable carrying means supported thereon, means for adjusting said carrying means, substantially horizontal disc cutters carried by said carrying means, and ground-engaging supports carried by said carrying means in the rear of said cutters for regulating the vertical position of said carrying means and of the cutters carried thereby relative to said frame.

9. In apparatus of the character described, a main frame, vertically adjustable carrying means supported thereon, substantially horizontal disc cutters carried thereby, means for adjusting said carrying means, and ground-engaging rollers carried by said carrying means in rear of said cutters so as to travel over the ground surface which said cutters have just passed over.

10. In apparatus of the character described, supporting means, a pair of arms pivoted at their rear ends on said supporting means, a positively driven upright shaft carried at the forward end of each of said arms, a substantially horizontal disc cutter carried at the lower end of each of said shafts, and a ground-engaging roller carried by each arm in rear of the cutter carried thereby.

11. In apparatus of the character described, a frame, vertically adjustable carrying means supported thereon, bottom cutting means carried thereby, means for adjusting said carrying means, and a ground-engaging caster mounted on said carrying means in the rear of said cutting means.

12. In apparatus of the character described, vertically adjustable carrying means, means for adjusting said carrying means, bottom cutting means carried thereby, a ground-engaging caster mounted on said carrying means, and means for adjusting said caster relative to said carrying means.

13. In apparatus of the character described a vertically adjustable pivot support, means for adjusting said pivot support, carrying means pivoted to said support to swing about a substantially horizontal axis, and bottom cutting means carried by said carrying means at a point substantially removed from said axis.

14. In apparatus of the character described carrying means movable about a substantially horizontal axis, bottom cutting means carried by said carrying means at a point removed from said axis, and means for changing the elevation of said axis.

15. In apparatus of the character described a main frame, a cradle pivoted to said main frame for movement about a horizontal axis, a carrying member pivoted to said cradle for movement about a horizontal axis substantially removed from the horizontal axis of said cradle, and bottom cutting means carried by said carrying member at a point substantially removed from the axis of pivotal support of said carrier on said cradle.

16. In a cane harvester a main frame, disc cutting means supported upon said main frame, for cutting the cane adjacent to the ground surface, means for varying the inclination of said disc cutting means relative to said main frame and to the ground surface, and means controlling the elevation of said cutters with reference to the ground.

17. In a cane harvester a substantially upright shaft, a disc cutter carried at the lower end thereof, means for adjusting the inclination of the cutter, and means causing the adjusted cutter to rise and fall in conformity to the contour of the ground it passes over.

18. In a cane harvester, a pair of positively driven substantially upright laterally spaced shafts, disc cutters carried by said shafts, a main frame, means for adjusting said shafts upon said main frame to change the angular positions of the axes of said shafts in vertical planes substantially parallel to the direction of travel of the apparatus and relative to said main frame, and means for lifting said shafts and cutters to an inoperative position.

19. In apparatus of the character described, a support, bottom cutting means, carrying means therefor pivoted to the support to swing about an axis, and driving means for said bottom cutting means including a power transmitting element rotatable about the axis of pivotal movement of said carrying means.

20. In apparatus of the character described the combination of a support, bottom cutting means, carrying means therefor mounted on the support for pivotal movement about a horizontal axis substantially removed from said bottom cutting means, and driving means for said bottom cutting means including a power transmitting element rotatable about the horizontal axis of pivotal movement of said carrying means.

21. In apparatus of the character described, a support, a carrying arm pivoted at one end to the support to swing about a horizontal axis and carrying near its other end an upright shaft, a disc cutter mounted on the lower end of said shaft, and driving means for said shaft and disc cutter including a power transmitting element mounted to rotate about the horizontal pivotal axis of said carrying arm.

22. In apparatus of the character described a main frame, a cradle member pivoted thereto for swinging movement about a horizontal axis, a carrying member pivoted to said cradle member for swinging movement about a horizontal axis, bottom cutting means carried by said carrying member, and driving connections for said bottom cutting means including power transmitting elements rotatable about the horizontal axes of said carrying member and cradle member respectively.

GEORGE D. LUCE.